United States Patent [19]

Harris et al.

[11] Patent Number: 4,804,724

[45] Date of Patent: * Feb. 14, 1989

[54] BLENDS OF A BIPHENYL CONTAINING POLY (ARYL ETHER SULFONE) AND A POLY (ARYL ETHER KETONE)

[75] Inventors: James E. Harris, Piscataway; Lloyd M. Robeson, Whitehouse Station, both of N.J.

[73] Assignee: Amoco Corporation, Chicago, Ill.

[*] Notice: The portion of the term of this patent subsequent to Dec. 15, 2004 has been disclaimed.

[21] Appl. No.: 132,304

[22] Filed: Dec. 15, 1987

Related U.S. Application Data

[60] Division of Ser. No. 876,294, Jun. 18, 1986, Pat. No. 4,713,426, Continuation of Ser. No. 655,580, Sep. 28, 1984, abandoned.

[51] Int. Cl.[4] .................... C08L 61/00; C08L 81/06
[52] U.S. Cl. .................................. 525/471; 525/534; 525/535
[58] Field of Search ............... 525/471, 534, 535, 390; 528/125

[56] References Cited

U.S. PATENT DOCUMENTS

| | | | |
|---|---|---|---|
| 3,287,363 | 11/1966 | Staniland et al. | 525/535 |
| 3,729,527 | 4/1973 | Nield | 525/535 |
| 3,819,582 | 6/1974 | Feasey | 525/535 |
| 4,052,365 | 10/1977 | Jones | 525/535 |
| 4,108,837 | 8/1978 | Johnson et al. | 524/609 |
| 4,435,350 | 3/1984 | Fukushima et al. | 528/125 |

FOREIGN PATENT DOCUMENTS

| | | | |
|---|---|---|---|
| 0008895 | 3/1980 | European Pat. Off. | 525/471 |
| 2108983 | 5/1983 | United Kingdom | 525/471 |

*Primary Examiner*—Allan M. Liebermann
*Attorney, Agent, or Firm*—Donald M. Papuga; William H. Magidson; Ralph C. Medhurst

[57] ABSTRACT

Described are blends of a biphenyl containing poly(acryl ether sulfone) and a poly(acryl ether ketone). These blends exhibit improved mechanical properties and environmental stress rupture resistance.

17 Claims, No Drawings

BLENDS OF A BIPHENYL CONTAINING POLY(ARYL ETHER SULFONE) AND A POLY(ARYL ETHER KETONE)

This is a division of application Ser. No. 876,294, filed June 18, 1986, now U.S. Pat. No. 4,713,426, which is a continuation of Ser. No. 655,580, filed on Sept. 28, 1984, now abandoned.

BACKGROUND OF THE INVENTION

Described herein are blends comprising a biphenyl containing poly(aryl ether sulfone) and a poly(aryl ether ketone). These blends have limited miscibility and excellent mechanical compatibility. These blends possess, in an article molded therefrom, a good balance of properties including higher modulus, impact resistance, solvent resistance and resistance to environmental stress cracking.

Poly(aryl ether ketones) offer an exceptional balance of properties; namely, high melting point, excellent thermal stability, excellent hydrolytic stability, high stiffness and strength, good toughness, and excellent solvent and environmental stress rupture resistance. However, the high melting point ($>300°$ C.) of poly(aryl ether ketones) seriously limits the number of polymeric systems which can be considered for blending. Further, the somewhat low glass transition temperature (Tg) of these materials ($<170°$ C.) limits their use in several applications such as composites, bearings and seals, and electrical connectors. This is primarily because of the loss in modulus as the Tg is traversed.

Polymer blends have been widely taught and employed in the art. As broad as this statement may be, the blending of polymers remains an empirical art and the selection of polymers for a blend giving special properties is, in the main, an Edisonian-like choice. Certain attributes of polymer blends are more unique than others. The more unique attributes when found in a blend tend to be unanticipated properties.

(A) According to Zoller and Hoehn, Journal of Polymer Science, Polymer Physics Edition, vol. 20, pp. 1385–1397 (1982)

"Blending of polymers is a useful technique to obtain properties in thermoplastic materials not readily achieved in a single polymer. Virtually all technologically important properties can be improved in this way, some of the more important ones being flow properties, mechanical properties (especially impact strength), thermal stability, and price.

... Ultimately, the goal of such modeling and correlation studies should be the prediction of blend properties from the properties of the pure components alone. We are certainly very far from achieving this goal."

In the field of miscibility or compatibility of polymer blends, the art has found predictability to be unattainable, even though considerable work on the matter has been done. According to authorities:

(B) "It is well known that compatible polymer blends are rare." Wang and Cooper, Journal of Polymer Science, Polymer Physics Edition, vol. 21, p. 11 (1983).

(C) "Miscibility in polymer-polymer blends is a subject of widespread theoretical as well as practical interest currently. In the past decade or so the number of blend systems that are known to be miscible has increased considerably. Moreover, a number of systems have been found that exhibit upper or lower critical solution temperatures, i.e., complete miscibility only in limited temperature ranges. Modern thermodynamic theories have had limited success to date in predicting miscibility behavior in detail. These limitations have spawned a degree of pessimism regarding the likelihood that any practical theory can be developed that can accommodate the real complexities that nature has bestowed on polymer-polymer interactions." Kambour, Bendler, Bopp, Macromolecules, 1983, 16, 753.

(D) "The vast majority of polymer pairs form two-phase blends after mixing as can be surmised from the small entropy of mixing for very large molecules. These blends are generally characterized by opacity, distinct thermal transitions, and poor mechanical properties. However, special precautions in the preparation of two-phase blends can yield composites with *superior* mechanical properties. These materials play a major role in the polymer industry, in several instances commanding a larger market than either of the pure components." Olabisi, Robeson and Shaw, Polymer-Polymer Miscibility, 1979, published by Academic Press, New York, N.Y., p. 7.

(E) "It is well known that, regarding the mixing of thermoplastic polymers, incompatibility is the rule and miscibility and even partial miscibility is the exception. Since most thermoplastic polymers are immiscible in other thermoplastic polymers, the discovery of a homogeneous mixture or partially miscible mixture of two or more thermoplastic polymers is, indeed, inherently unpredictable with any degree of certainty, for example, see P. J. Flory, *Principles of Polymer Chemistry,* Cornell University Press, 1953, Chapter 13, page 555." Younes, U.S. Pat. No. 4,371,672.

(F) "The study of polymer blends has assumed an ever-increasing importance in recent years and the resulting research effort has led to the discovery of a number of miscible polymer combinations. Complete miscibility is an unusual property in binary polymer mixtures which normally tend to form phase-separated systems. Much of the work has been of a qualitative nature, however, and variables such as molecular weight and conditions of blend preparation have often been overlooked. The criteria for establishing miscibility are also varied and may not always all be applicable to particular systems." Saeki, Cowie and McEwen, Polymer, 1983, vol. 24, January, p. 60.

Blends of poly(aryl ether ketones) and poly(aryl ether sulfones) have been briefly alluded to in the patent literature. British Pat. No. 1,446,962 (page 3, lines 28 to 32) states "The aromatic polyether ketone may be blended with other thermoplastic polymeric substances, for example, polyesters, polyolefins, polyamides, polysulfones, and poly(vinyl chloride). The composition may be further mixed with particles; e.g., elastomeric materials and polytetrafluoroethylene."

This disclosure generally describes blends of poly(aryl ether ketones) and poly(aryl ether sulfones). However, the above-quoted statement contains so many inaccuracies that it is, in essence, not relevant. Blending poly(vinyl chloride) at temperatures $>300°$ C. would give instantaneous degradation yielding large quantities of hydrochloric acid as well as other noxious by-products.

Polyolefins, polyesters (e.g., poly(ethylene terephthalate), poly(butylene terephthalate) and polyamides (e.g., nylon 6, nylon 6,6, nylon 11, and nylon 12) also will severely degrade at processing temperature in excess of 300° C. and thus produce useless blends with poly(aryl ether ketones).

U.S. Pat. No. 3,324,199 describes blends of a specific poly(aryl ketone) containing ortho hydroxy groups (relative to the ketone group). These materials are described as ultraviolet light stabilizers for a variety of polymers including polyethylene, polypropylene, poly(vinyl chloride), poly(vinylidene chloride), polyacrylic acid esters, polyacrylonitrile, polyvinyl fluoride, polyvinylidene fluoride, polytetrafluoroethylene, polychlorotrifluoroethylene, polyesters, polyamides, and polyimides. These poly(aryl ketones) are generally amorphous and require aromatic hydroxyls ortho to the main chain ketones. The poly(aryl ketones) of this invention are crystalline, have no ortho hydroxyls, and could not be blended with many of the above mentioned polymers as the melting point of the poly(aryl ether ketones) are higher than the degradation temperature of most of the above cited polymers.

It has been found that the reaction product of biphenol and 4,4'dichlorodiphenyl sulfone (biphenol based polysulfone) exhibits an interesting property balance and exhibits a limited level of miscibility in blends with poly(aryl ether ketones). The level of intermixing is at least partially responsible for the excellent mechanical properties exhibited by the blend. Other poly(aryl ether sulfones) containing biphenyl have been found to exhibit similar characteristics in blends with poly(aryl ether ketones).

patibility between the poly(aryl ether sulfone) and poly(aryl ether ketone).

In the blend, the poly(aryl ether sulfone) is used in amounts of from about 5 to about 95, preferably from about 20 to about 75 weight percent while the poly(aryl ether ketone) is used in amounts of from about 95 to about 5, preferably from about 35 to about 80 weight percent.

THE POLY(ARYL ETHER SULFONES)

The poly(aryl ether sulfones) which are suitable for use in the blend of this invention contain at least one biphenyl unit in the structure. The preferred biphenyl containing poly(aryl ether sulfone) contains the repeating unit:

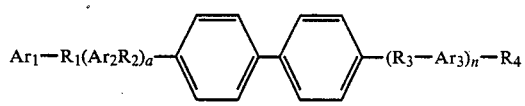

wherein $R_1$ through $R_4$ are —O—, —SO$_2$—,

S with the proviso that at least one of $R_1$ through $R_4$ is —SO$_2$—, $Ar_1$ through $Ar_3$ are arylene of 6 to 24 carbon atoms, preferably phenylene or biphenylene; a and n are 0 or 1.

The preferred poly(aryl ether sulfones) include those having the following reoccurring units:

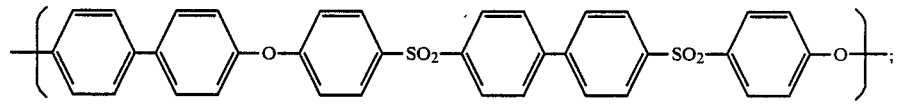

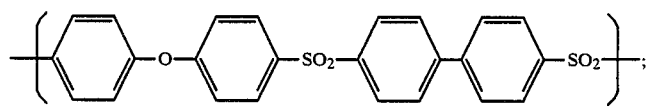

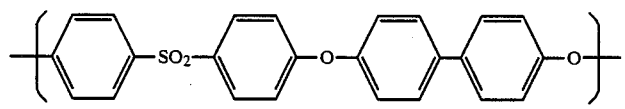

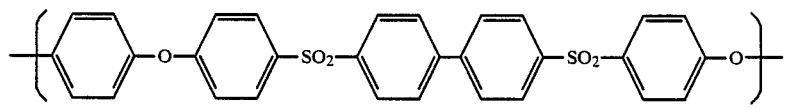

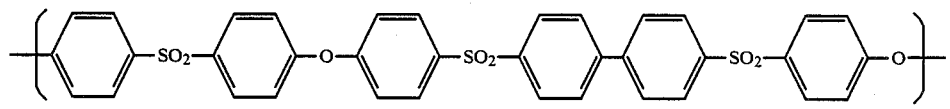

THE INVENTION

This invention is directed to a blend of a biphenyl containing poly(aryl ether sulfone) and a poly(aryl ether ketone). The presence of the biphenyl unit in the poly(aryl sulfone) appears important in obtaining com- The poly(aryl ether sulfones) are produced by methods well known in the art such as those described in U.S. Pat. Nos. 3,634,355; 4,008,203; 4,108,837 and 4,175,175.

THE POLY(ARYL ETHER KETONE)

The crystalline poly(aryl ether ketone)s which are suitable for use herein can be generically characterized as containing a repeating unit of one or more of the following formulae:

(I)

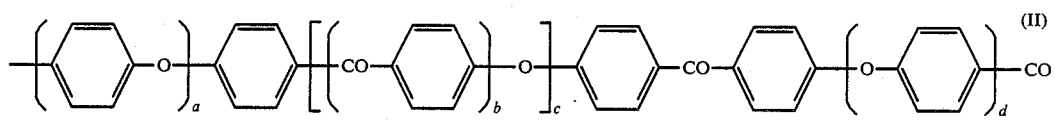
(II)

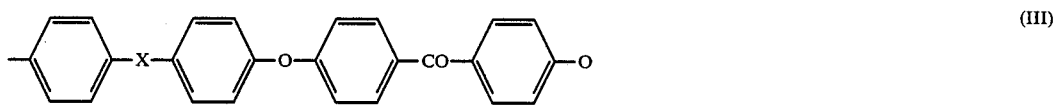
(III)

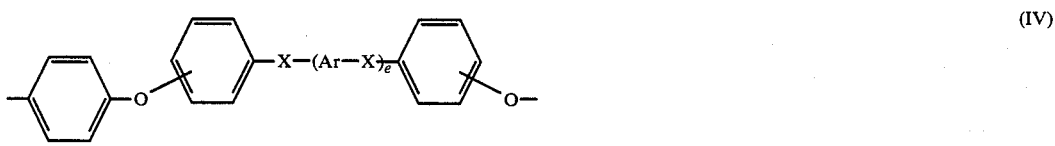
(IV)

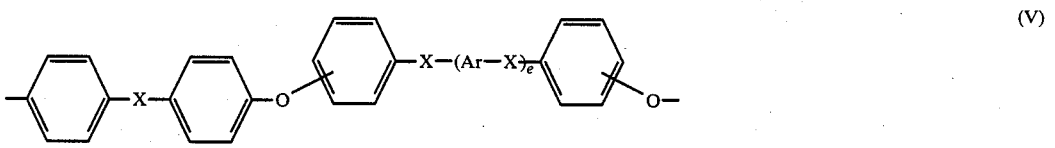
(V)

wherein Ar is independently a divalent aromatic radical selected from phenylene, biphenylene or naphthylene, X is independently O, $$\overset{O}{\underset{\|}{C}},$$

or a direct bond and n is an integer of from 0 to 3, b, c, d and e are 0 or 1 and a is an integer of 1 to 4 and preferably d is 0 when b is 1.

Preferred poly(aryl ketone)s include those having a repeating unit of the formula:

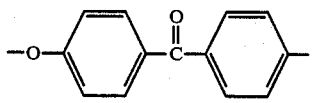

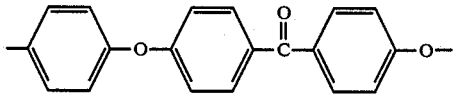

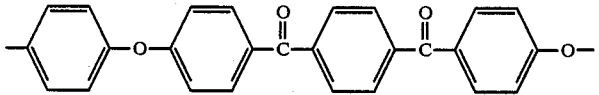

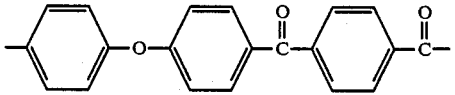

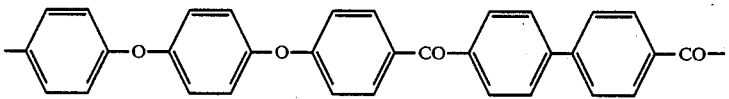

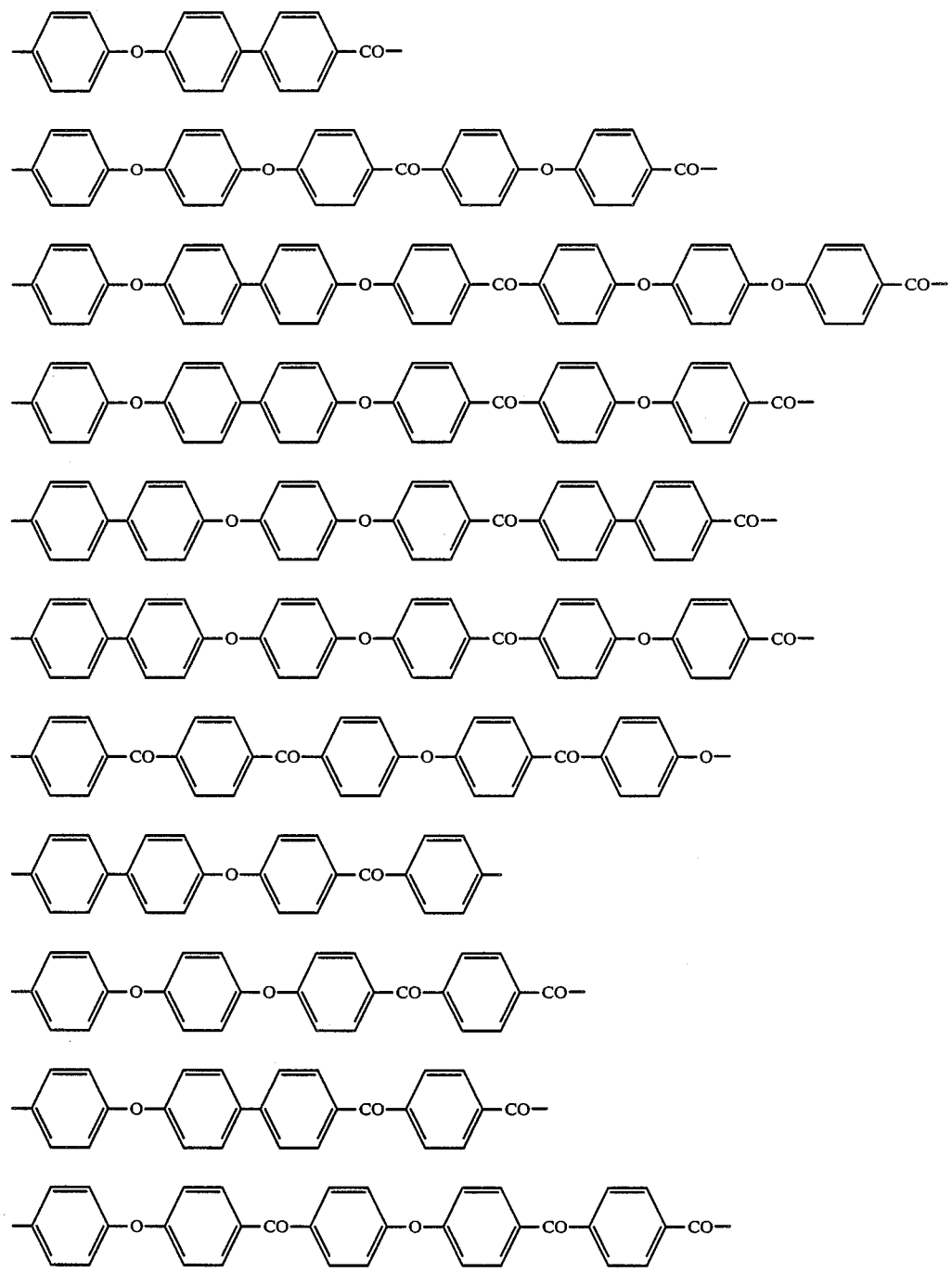

These poly(aryl ketone)s are prepared by methods well known in the art. One such method comprises heating a substantially equimolar mixture of at least one bisphenol and at least one dihalobenzoid compound or at least one halophenol compound as described in Canadian Pat. No. 847,963. Preferred bisphenols in such a process include:
hydroquinone,
4,4'-dihydroxybenzophenone,
4,4'-dihydroxybiphenyl, and
4,4'-dihydroxydiphenyl ether.

Preferred halo and dihalobenzoid compounds include:

4-(4-chlorobenzoyl)phenol,
4,4'-difluorobenzophenone,
4,4'-dichlorobenzophenone,
4-chloro-4'-fluorobenzophenone,

and

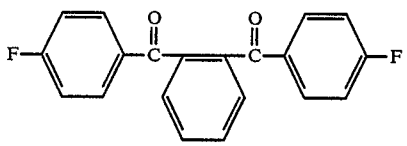

The poly(aryl ketone)s may be produced by the process as described in, for example, U.S. Pat. No. 4,176,222. This process comprises heating in the temperature range of 100° to 400° C., (i) a substantially equimolar mixture of (a) at least one bisphenol and (b) at least one dihalobenzenoid compound, or (ii) at least one halophenol, in which in the dihalobenzenoid compound or halophenol, the halogen atoms are activated by —CO— groups ortho or para thereto, with a mixture of sodium carbonate or bicarbonate and a second alkali metal carbonate or bicarbonate, the alkali metal of said second alkali metal carbonate or bicarbonate having a higher atomic number than that of sodium, the amount of said second alkali metal carbonate or bicarbonate being such that there are 0.001 to 0.5 gram atoms of said alkali metal of higher atomic number per gram atom of sodium, the total amount of alkali metal carbonate or bicarbonate being such that there is at least one alkali metal atom for each phenol group present, and thereafter separating the polymer from the alkali metal halide.

Also, poly(aryl ketone)s such as those containing repeating units of the formula:

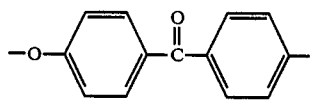

may be produced by Friedel-Craft reactions utilizing hydrogen fluoride-boron trifluoride catalysts as described, for example, in U.S. Pat. No. 3,953,400.

Additionally, poly(aryl ketones) of the following formula:

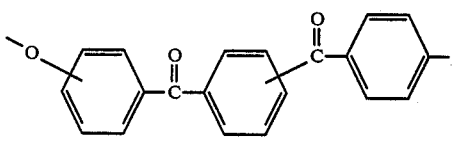

may be prepared by Friedel-Craft reactions using a boron fluoride-hydrogen fluoride catalyst as described in, for example, U.S. Pat. Nos. 3,441,538; 3,442,857 and 3,516,966.

The polyketones may also be prepared according to the process as described in, for example, U.S. Defensive Publication T 103,703 and U.S. Pat. No. 4,396,755. In this process, reactants such as (a) an aromatic monocarboxylic acid, (b) a mixture of at least one aromatic dicarboxylic acid, and (c) combinations of (a) and (b) are reacted in the presence of a fluoroalkane sulphonic acid, particularly trifluoromethane sulphonic acid.

Additionally, poly(aryl ether ketone)s of the following formulas:

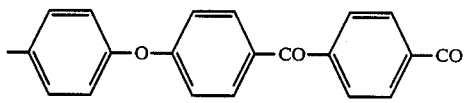

may also be prepared according to the process as described in, for example, U.S. Pat. No. 4,398,020. In such a process, (a) a mixture of substantially equimolar amounts of
  (i) at least one aromatic diacyl halide of the formula

where —Ar— is a divalent aromatic radical, Y is halogen and COY is an aromatically bound acyl halide group, which diacyl halide is polymerizable with at least one aromatic compound of (a)(ii), and
  (ii) at least one aromatic compound of the formula

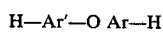

where —Ar'— is a divalent aromatic radical and H is an aromatically bound hydrogen atom, which compound is polymerizable with at least one diacyl halide of (a)(i), and (b) at least one aromatic monoacyl halide of formula

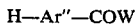

where —Ar"— is a divalent aromatic radical and H is an aromatically bound hydrogen atom, Y is halogen, and COY is an aromatically bound acyl halide group, which monoacyl halide is self-polymerizable, and (c) a combination of (a) and (b) in the presence of a fluoroalkene sulphonic acid.

The term poly(aryl ether ketone) as used herein is meant to include homopolymers, copolymers, terpolymers, block copolymers, graft copolymers, and the like. For example, any one or more of the repeating units (I) to (V) may be combined to form copolymers, etc.

The poly(aryl ether ketone)s have a reduced viscosity of at least about 0.3 to about 5.0 dl/g, as measured in concentrated sulphuric acid at 25° C.

It should, of course, be obvious to those skilled in the art that other additives may be included in the blends of this invention. These additives include plasticizers; pigments; flame retardants; reinforcing agents, such as glass fibers; thermal stabilizers; ultraviolet light stabilizers; impact modifiers, and the like. The blends may be fabricated into any desired shape, i.e., moldings, coatings, films or fibers. They may be used to mold gears, bearings, and the like.

EXAMPLES

The following examples serve to give specific illustrations of the practice of this invention but they are not intended in any way to limit the scope of this invention.

The following designations are used in the examples and they have the following meaning:

Polyketone I: A polymer having a repeating unit of the formula:

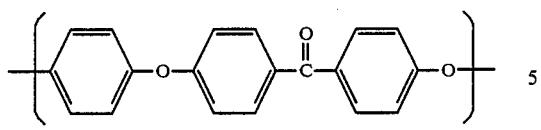

having a reduced viscosity of 1.2 dl/g as measured in 96% sulfuric acid (1 wt. % solution) at 25° C. (PEEK obtained from Imperial Chemicals Co.)

Polyketone II: A polymer having a repeating unit of the formula:

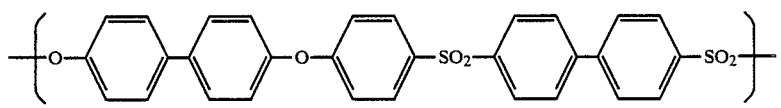

having a reduced viscosity of 1.1 dl/g as measured at 1 wt. % in 96 wt. % sulfuric acid at 25° C.

Polysulfone I: A polymer having a repeating unit of the formula:

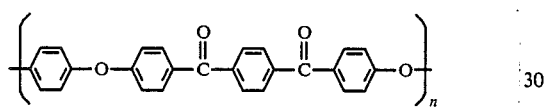

having a reduced viscosity of 0.59 dl/g as measured in N-methylpyrrolidone at 25° C. (0.2 gr/100 ml).

Polysulfone II: A polymer having a repeating unit of the formula:

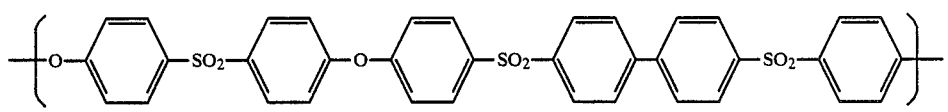

having a reduced viscosity of 0.51 dl/g as measured in N-methyl pyrrolidone at 25° C. (0.2 gr/100 ml).

Polysulfone III: A polymer having a repeating unit of the formula:

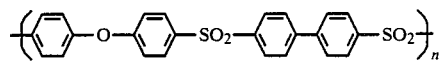

having a melt flow of 0.68 dg/minutes at 44 psi and 400° C. (ASTM D-1238).

Polysulfone IV: A random copolymer having repeating units of

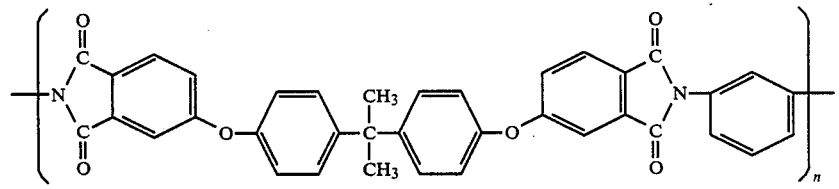

in a ratio of 75/25 and having an R.V. of 0.42 dl/g as measured in N-methyl pyrrolidone (0.2 gr/100 ml solution at 25° C.).

Control Polysulfone: A polymer having a repeating unit of the formula:

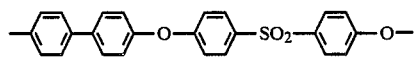

having a reduced viscosity of 0.48 dl/g as measured in N-methyl pyrrolidone (0.2 gr/100 ml) at 25° C.

Polyetherimide: A polymer having a repeating unit of the formula:

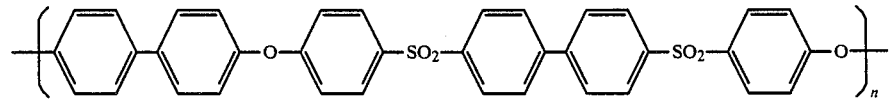

having a reduced viscosity of 0.51 dl/g as measured in chloroform (0.2 g/100 ml) 25° C.

EXAMPLE 1

90 weight percent of Polysulfone I and 10 weight percent of Polyketone I were blended in a 36/1 L/D one inch extruder with two fluted mixing sections at 360° C. The properties were obtained on tensile specimens injection molded in a 1¼ oz Newburg screw injection molding machine at 380° C. Properties were determined as per ASTM tests:

| | ASTM |
|---|---|
| Tensile Modulus | D-638 |
| Tensile Strength | D-638 |
| % Elongation | D-638 |
| Notched Izod Impact Strength | D-256 |
| Tensile Impact Strength | D-1822 |
| Heat Distortion Temperature | D-648 |
| Flexural Modulus | D-790 |
| Flexural Strength | D-790 |

The properties are shown in Table I.

EXAMPLES 2 to 4

The procedure of Example 1 was exactly repeated except that the components of the blend were the following:

Example 2:
 80 weight % Polysulfone I
 20 weight % Polyketone I
Example 3:
 65 weight % Polysulfone I
 35 weight % Polyketone I
Example 4:
 50 weight % Polysulfone I
 50 weight % Polyketone I The results are shown in Table I.

It can be seen that the addition of Polysulfone I to Polyketone I in the amount of at least 50% improves the heat deflection temperature of the latter.

Samples of Examples 1 to 4 were compression molded at 360° C. in a cavity mold into 20 mil thick 4×4 inch plaques.

20 mil strips ⅛" wide were shear cut from the compression molded specimens. The samples were loaded in tension using lever-arm weighting arrangement. A cotton swab was placed on the center of the specimen and saturated with the test environment at time zero. The time to rupture was determined unless the sample did not rupture in 2 hours; then the qualitative characteristic of the sample was noted (e.g., crazing and embrittlement).

The environmental stress rupture results are shown in Table II. It is seen that the addition of Polyketone I to Polysulfone I improves the environmental stress rupture resistance of the latter, particularly when the polyketone is present in amounts greater than 20% by weight.

TABLE II

ENVIRONMENTAL STRESS RUPTURE RESULTS

| Environment | Stress | POLYSULFONE I | 90% POLYSULFONE I 10% POLYKETONE I | 80% POLYSULFONE I 20% POLYKETONE I | 65% POLYSULFONE I 35% POLYKETONE I | 50% POLYSULFONE I 50% POLYKETONE I |
|---|---|---|---|---|---|---|
| | | | Time to Rupture | | | |
| Acetone | 1000 psi | 25 sec R | 11 sec R | 22 sec R | 0.09 hrs R | |
| | 2000 psi | | | | | 2 hrs C & B |
| Ethyl Acetate | 1000 psi | 0.42 hrs R | 0.06 hrs R | 0.05 hrs R | 2 hrs NCNB | |
| | 2000 psi | | | | | 2 hrs C & B |
| Toluene | 1000 psi | 0.85 hr R | 53 sec R | 2 hrs NCNB | 2 hrs NCNB | |
| | 2000 psi | | | | | 2 hrs NCNB |
| Trichloroethylene | 1000 psi | 7 sec R | 10 sec R | 24 sec R | 0.04 hr R | |
| | 2000 psi | | | | | 0.86 hr R |

C & B = crazed and brittle
NCNB = not crazed, not brittle
R = rupture

EXAMPLES 5 to 9

The procedure of blending the indicated polymers was identical to that described in Example 1:

Example 5
 75 weight % of Polyketone I
 25 weight % of Polysulfone I
Example 6
 50 weight % of Polyketone I
 50 weight % of Polysulfone I
Example 7
 35 weight % of Polyketone I
 65 weight % of Polysulfone I
Example 8
 20 weight % of Polyketone I
 80 weight % of Polysulfone I
Example 9
 10 weight % of Polyketone I
 90 weight % of Polysulfone I The blends were compression molded into 20 mil thick, 4×4 inch plaques at 360° C. in a cavity mold.

TABLE I

| | POLYSULFONE I | POLYKETONE I | 90% POLYSULFONE I 10% POLYKETONE I | 80% POLYSULFONE I 20% POLYKETONE I | 65% POLYSULFONE I 35% POLYKETONE I | 50% POLYSULFONE I 50% POLYKETONE I |
|---|---|---|---|---|---|---|
| Tensile Modulus (psi) | 332,000 | 527,000 | 332,000 | 342,000 | 358,000 | 414,000 |
| Tensile Strength (psi) | 10,500 | 13,100 | 11,700 | 11,700 | 11,800 | 11,500 |
| % Elongation | 98 | 75 | 105 | 103 | 117 | 90 |
| Notched Izod Impact Strength (ft-lbs/in of notch) | 13.8 | 1.3 | 14.2 | 15.5 | 5.2 | 2.6 |
| Tensile Impact Strength (ft-lbs/in$^2$) | 243 | 94 | 156 | 189 | 175 | 138 |
| Heat Distortion Temperature (264 psi, ⅛' bar) | 196° C. | 145° C. | | | | 155° C. |
| Flexural Modulus (psi) | 330,000 | | 349,000 | 361,000 | 375,000 | 412,000 |
| Flexural Strength (psi) at 5% Strain | 12,400 | | 13,400 | 13,900 | 14,500 | 16,000 |

The calorimetric data and crystallization rate data were obtained using a Perkin-Elmer DSC-2. the results are listed in Table III. Here it should be noted that the addition of Polysulfone I to Polyketone I slows the crystallization rate of the latter. This manifests itself as a reduction in $T_c$ and an increase in $t_c$ with polysulfone content. Further, the melting point of the polyketone and the glass transition of the polysulfone decrease slightly with the addition of the other component.

TABLE IV-continued

CALORIMETRIC AND CRYSTALLIZATION RATE DATA

| | POLYKETONE II | 50% POLY-SULFONE I 50% POLY-KETONE II |
|---|---|---|
| @300° C. | — | 104 |
| @290° C. | — | 85 |

TABLE III

CALORIMETRIC AND CRYSTALLIZATION RATE DATA

| | POLYKETONE I | 75% POLY-KETONE I 25% POLY-SULFONE I | 50% POLY-KETONE I 50% POLY-SULFONE I | 35% POLY-KETONE I 65% POLY-SULFONE I | 20% POLY-KETONE I 80% POLY-SULFONE I | 10% POLY-KETONE I 90% POLY-SULFONE I |
|---|---|---|---|---|---|---|
| $T_g$ (°C.) | 140* | — | 212 | 210 | 207 | 212 |
| $T_m$ (°C.) | 337 | 336 | 334 | 334 | 333 | 332 |
| $\Delta H_f$ (cal/gr) | 7.9 | 6.1 | 3.8 | 2.4 | 1.2 | 0.6 |
| $T_c$ (°C.) 10° C./min Cooling | 297 | 291 | 288 | 286 | 282 | |
| $\Delta H_C$ (cal/gr) | 9.9 | 7.5 | 4.5 | 3.1 | 1.1 | |
| $T_c$ (°C.) 160° C./min cooling | 251 | — | 240 | 232 | | |
| $T_g$ (°C.) after cooling at 160° C./min | 142* | — | 208 | 209 | 209 | 209 |
| $t_c$ (seconds) | | | | | | |
| 310° C. | 212 | 415 | — | — | — | |
| 300° C. | 79 | 137 | 205 | 232 | 345 | |
| 290° C. | 51 | 72 | 92 | 100 | 133 | |
| 280° C. | — | — | 62 | 65 | 77 | |

*$T_g$ of Polyketone I, other $T_g$ values for polysulfone I rich phase.
$T_g$ of Polysulfone I as molded = 215° C.; after quench at 160° C./min $T_g$ = 215°.
$T_g$ and $T_m$ determined with heating rate of 10° C./min. $T_c$ determined at noted cooling rate after heating above Tm.
$t_c$ is the time required to reach maximum crystallization rate after heating above Tm and cooling at 160° C./min to designated temperature.

EXAMPLE 10

50 weight percent of Polyketone II and 50 weight percent of Polysulfone I were blended in a Brabender blender at 390° C. The blend was compression molded at 380° C. into 20 mil thick 4×4 inch plaques. The calorimetric and crystallization rate data were obtained using a Perkin-Elmer DSC-2. Again, a reduction in crystallization rate is seen.

The results are shown in Table IV.

TABLE IV

CALORIMETRIC AND CRYSTALLIZATION RATE DATA

| | | POLYKETONE II | 50% POLY-SULFONE I 50% POLY-KETONE II |
|---|---|---|---|
| $T_m$, °C. | heating at | 363 | 360 |
| $\Delta H_f$, cal/gr | 10° C./min | 9.7 | 4.8 |
| $T_c$, °C. | cooling at | 319 | 306 |
| $\Delta H_c$, cal/gr | 10° C./min | 13.9 | 6.1 |
| $t_c$ (seconds) | | | |
| @320° C. | | 84 | 280 |
| @310° C. | | 59 | 145 |

EXAMPLE 11

50 weight percent of Polyketone I was blended with 50 weight percent of Polysulfone III in a Brabender blender at 390° C. The blend was compression molded at 370° C. into 20 mil thick 4×4 inch plaques. The calorimetric and crystallization rate data were obtained using a Perkin-Elmer DSC-2

The results are shown in Table V.

EXAMPLE 12

The procedure of Example 11 was exactly repeated except that 80 weight percent of Polyketone I was blended with 20 weight percent of Polysulfone II.

The results are shown in Table V.

Examples 11 and 12 again demonstrate the reduction in crystallization kinetics when a biphenyl containing poly(aryl ether sulfone) is mixed with a crystalline polyketone.

TABLE V

CALORIMETRIC AND CRYSTALLIZATION RATE DATA

| | | POLY-KETONE I | 50% POLY-KETONE I 50% POLY-SULFONE III | 80% POLY-KETONE I 20% POLY-SULFONE II |
|---|---|---|---|---|
| $T_m$, °C. | heating at | 337 | 338 | 337 |
| $\Delta H_f$, cal/gr | 10° C./min | 7.9 | 4.2 | 7.2 |
| $T_c$, °C. | cooling at | 297 | 289 | 287 |
| $\Delta H_c$, cal/gr | 10° C./min | 9.9 | 5.5 | 8.8 |
| $t_c$ (seconds) | | | | |
| @320° C. | | 212 | 625 | 720 |
| @310° C. | | 79 | 200 | 214 |
| @300° C. | | 51 | 101 | 109 |
| @290° C. | | — | 74 | 77 |

CONTROL

In order to compare the characteristics of a poly(aryl ether sulfone) not containing a biphenyl unit in the backbone in blends with poly(aryl ether ketone), Control Polysulfone was chosen. A 50/50 blend of Control Polysulfone/Polyketone I was prepared by extrusion at 360° C. Injection molded samples were prepared for mechanical property testing and compression molded samples were prepared for environmental stress rupture resistance. The results of this blend are compared with Example 4, i.e., a 50/50 blend of Polysulfone I and Polyketone I. The environmental stress rupture resistance of the biphenol based Polysulfone I/Polyketone I blend was significantly superior to the Control Polysulfone/Polyketone I blend.

TABLE VI

|  | 50% POLY-SULFONE I 50% POLY-KETONE I | CONTROL 50% POLY-SULFONE 50% POLY-KETONE I |
|---|---|---|
| Mechanical Property Results | | |
| Tensile Modulus (psi) | 414,000 | 438,000 |
| Tensile Strength (psi) | 11,500 | 12,300 |
| % Elongation | 90 | 132 |
| Notched Izod Impact Strength (ft-lbs/in of notch) | 2.6 | 1.6 |
| Tensile Impact Strength (ft-lbs/in$^2$) | 138 | 164 |
| Environmental Stress Rupture Results | | |
| Environment | Stress | Time to Rupture |
| Acetone | 2000 psi | 2 hrs C & B / 5 sec R |
| Ethyl Acetate | 2000 psi | 2 hrs C & B / 19 sec R |
| Toluene | 2000 psi | 2 hrs NCNB / 0.24 hrs R |
| Trichloroethylene | 2000 psi | 0.86 hrs R / 0.032 hrs R |

EXAMPLE 13

Control

The following polymers were blended in a Brabender blender at 380° C.:
Example 13:
  50 weight % Polysulfone I
  50 weight % Polyketone I
Control
  50 weight % Control Polysulfone
  50 weight % Polyketone I The blends were molded in a specially designed compression mold at 360° C. into thrust washers and tested for wear rate in a Falex No. 6 thrust washer testing machine as per ASTM D-3702. The wear results at three different PV (pressure×velocity) values are listed below:

|  | Wear Rate (inches/hour) | | |
|---|---|---|---|
| PV (psi × ft/min) = | 1000 | 2500 | 5000 |
| Example 13 | $6.3 \times 10^{-5}$ | $1.18 \times 10^{-4}$ | $2.1 \times 10^{-4}$ |
| Control | $7.3 \times 10^{-5}$ | $1.5 \times 10^{-4}$ | $4.33 \times 10^{-4}$ |

EXAMPLE 14

33⅓ weight percent of Polysulfone I, 33⅓ weight percent of Polyketone I and 33⅓ weight percent of Polyetherimide were extruded in a 36/1 L/D 1 inch single screw extruder at 360° C. and injection molded at 380° C. into ASTM test bars. The test bars were tested as described in Example 1.

The mechanical property results are listed below in Table VII. It is of interest to point out that the molded specimens were transparent.

TABLE VII

| Flexural Modulus (psi) | 428,000 |
|---|---|
| Flexural Strength (5% strain) (psi) | 16,900 |
| Notched Izod Impact Strength (ft-lbs/in of notch) | 1.6 |
| Tensile Impact Strength (ft-lbs/in$^2$) | 151 |
| Heat Distortion Temperature (°C.) ⅛" bar, 264 psi | 167 |

One of the property deficiencies of poly(aryl ether ketones) is the limited load bearing capabilities above the glass transition temperature (>140° to 220° C.), the addition of the biphenyl containing poly(aryl ether sulfones) to poly(aryl ether ketones) will yield increased stiffness thus improved load bearing capabilities. The tensile modulus data listed below demonstrates this behavior.

|  | Tensile Modulus (psi) | |
|---|---|---|
|  | 175° C. | 200° C. |
| Polyketone I | 56,000 | 42,000 |
| 75% Polyketone I/25% Polysulfone I | 75,000 | 50,000 |
| 50% Polyketone I/50% Polysulfone I | 106,000 | 49,000 |
| 35% Polyketone I/65% Polysulfone I | 135,000 | 103,000 |

EXAMPLE 15

50% by weight of Polysulfone IV and 50% by weight of Polyketone I were mixed in a Brabender blender at 380° C. The blend was compression molded at 380° C. in a cavity mold into 20 mil thick 4×4 inch plaques. Strips ⅛ inch wide were shear cut from the plaques and tested for 1% secant modulus by a method similar to ASTM D-638; tensile strength and elongation at break according to ASTM D-638; environmental stress rupture resistance as in Examples 1 to 4; and pendulum impact strength. [Pendulum impact strength is measured as follows: A steel pendulum is used, cylindrical in shape with a diameter of 0.83 inch and weighing 1.562 pounds; the striking piece, mounted almost at the top of the pendulum is a cylinder 0.3 inch in diameter; film specimens, 4 inches long, 0.125 inch wide and about 1 to 30 mils thick are clamped between the jaws of the tester so that the jaws are spaced 1 inch apart; the 0.125 inch width of the film is mounted vertically; the pendulum is raised to a constant height to deliver 1.13 foot pounds at the specimen; When the pendulum is released the cylindrical striking piece hits the specimen with its flat end, breaks the film, and travels to a measured height beyond; the difference in the recovery height (i.e., the difference in the potential energy of the pendulum at the maximum point of the upswing) represents the energy absorbed by the specimen during the rupture; the impact strength, expressed in foot-pounds per cubic inch, is obtained by dividing the pendulum energy loss by the volume of the specimen].

The results are given in Table VIII. Also given for comparison are the properties of Polysulfone IV and Polyketone I determined on specimens prepared and tested as described above. Note that the stress crack resistance of the Polysulfone IV is greatly improved with the addition of the polyketone. Also note that the elongation of break of the blend of Example 15 is much greater than that of Polysulfone IV or Polyketone I.

TABLE VIII

|  | Polysulfone IV | Polyketone I | Example 15 |
|---|---|---|---|
| 1% secant modulus (ksi) | 246 | 391 | 225 |
| Tensile strength (psi) | 11,600 | 13,300 | 13,000 |
| Elongation at break (%) | 8.2 | 33 | 107 |
| Pendulum Impact Strength ft-lbs/in³) | 132 | 170 | 118 |

| | Environmental Stress Rupture Resistance | |
|---|---|---|
| Environment | | Stress |
| Ethyl Acetate | 2,000 0.07 hr R | — 42.6 hrs NCNB |
| 1,1,1 tri-chloroethane | 5,000 0.27 hr R | — 1.7 hr R |
| Toluene | 2,000 1.13 hr R | — 64.6 hrs NCNB |
| Acetone | 1,000 22 hr NCNB | — 27.1 hrs NCNB |

R = Rupture
NCNB = Not crazed, not brittle

DISCUSSION OF RESULTS

Blends of poly(aryl ether ketones) and poly(aryl ether sulfones) exhibit excellent mechanical compatibility. The results indicate that a low level of miscibility is observed in these blends as the Tg of the poly(aryl ether sulfone) is slightly decreased and the crystallization kinetics of the poly(aryl ether ketone) are slower. The decrease in Tc (crystallization temperature), the decrease in Tm (crystallization melting point), and the increase in time to maximum crystallization rate ($t_c$) are all indicative of limited miscibility of the poly(aryl ether sulfones) with the poly(aryl ether ketones). Also desired in these blends at intermediate compositions will be good environmental stress rupture resistance. At a weight ratio of 50/50 Polysulfone I/Polyketone I and poly(ether sulfone), i.e., Control Polysulfone/Polyketone I; the Polysulfone I/Polyketone I blend exhibits significantly better environmental stress rupture resistance than the poly(ether sulfone), i.e., Control Polysulfone/Polyketone I blend. The same may be said for the blend of Polysulfone IV/Polyketone I.

Polysulfone II and III which contain a biphenyl unit in the main chain also yield limited miscibility with poly(aryl ether ketone) based on crystallization temperature decrease and increased time to reach maximum crystallization rate.

The addition of poly(aryl ether ketones) to the biphenyl containing poly(aryl ether sulfones) will lead to improved solvent resistance and environmental stress rupture resistance. The addition of the biphenyl containing poly(aryl ether sulfones) to poly(aryl ether ketones) will yield improved toughness and higher modulus (thus load bearing capabilities) in the range between the poly(aryl ether ketone) $T_g$ (140° C. to 170° C.) and the poly(aryl ether sulfone) $T_g$ (220° to 290° C.). This is an important improvement as the load bearing capability of the poly(aryl ether ketones) is limited above the $T_g$.

The aforementioned improvement in toughness is especially true for the blend of Polysulfone IV/Polyketone I (Example 15) where the blend has a much greater elongation at break than either of the constituents. It is postulated that this may be due to the partial miscibility of biphenyl containing polysulfones and poly(aryl ether ketones) which suppresses the crystallinity of the latter. Crystallinity is well known to reduce toughness over the chemically equivalent amorphous material.

It is interesting to note that blends of Polysulfone I and Polyketone I are reasonably transparent (if quenched to prevent crystallization) indicating a high degree of mixing and/or possibly matched refractive indices. The blend of Control Polysulfone and Polyketone I was opaque.

What is claimed is:

1. A blend comprising a biphenyl containing poly(aryl ether sulfone) and a poly(aryl ether ketone) wherein said biphenyl containing poly(aryl ether sulfone) comprises from about 25 to 95 weight percent of said poly(aryl ether sulfone) and poly(aryl ether ketone).

2. A blend as defined in claim 1 wherein the poly(aryl ether sulfone) contains the repeating unit:

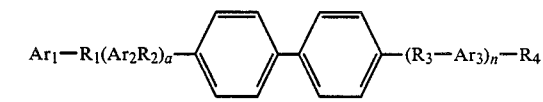

wherein $R_1$ through $R_4$ are —O—, —SO$_2$—,

S with the proviso that at least one of $R_1$ through $R_4$ is —SO$_2$—, Ar$_1$ through Ar$_3$ are arylene of 6 to 24 carbon atoms, preferably phenylene or biphenylene; a and n are 0 or 1.

3. A blend as defined in claim 1 wherein the poly(aryl ether sulfone) has the following repeating unit:

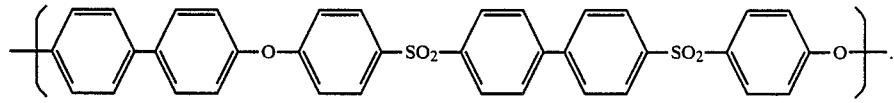

4. A blend as defined in claim 1 wherein the poly(aryl ether sulfone) has the following repeating unit:

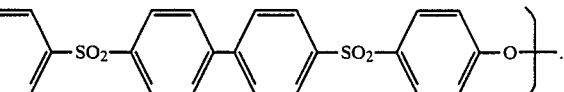

5. A blend as defined in claim 1 wherein the poly(aryl ether sulfone) has the following repeat unit:

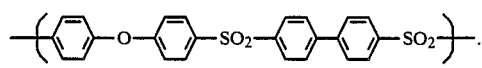

6. A blend as defined in claim 1 wherein the poly(aryl ether sulfone) has the following repeat unit:

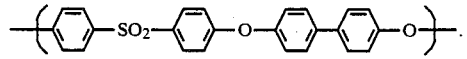

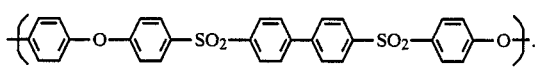

7. A blend as defined in claim 1 wherein the poly(aryl ether sulfone) is a copolymer having the repeating units:

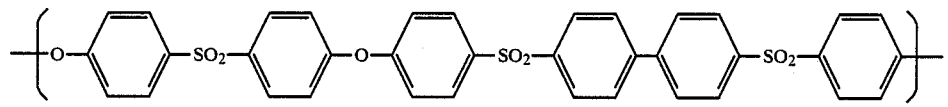

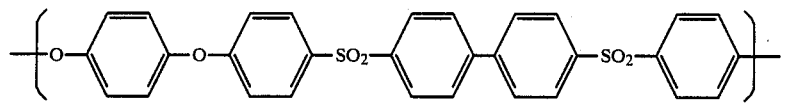

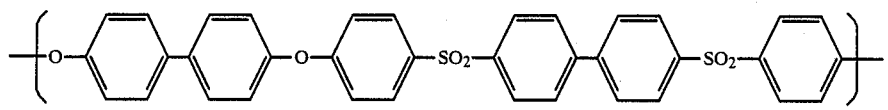

arranged randomly along the chain.

8. A blend as defined in claim 1 wherein the poly(aryl ether ketone) has a repeating unit of the following formula:

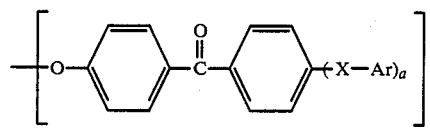

wherein Ar is independently a divalent aromatic radical selected from phenylene, biphenylene or naphthylene, X is independently O,

or a direct bond and n is an integer of from 0 to 3.

9. A blend as defined in claim 1 wherein the poly(aryl ether ketone) has a repeating unit of the following formula:

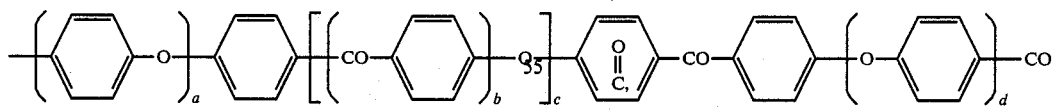

wherein a is an integer of 1 to 4 and b, c, and d are 0 to 1.

10. A blend as defined in claim 1 wherein the poly(aryl ether ketone) has a repeating unit of the following formula:

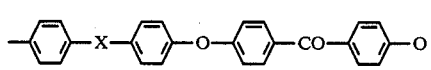

wherein X is independently O,

or a direct bond.

11. A blend as defined in claim 1 wherein the poly(aryl ether ketone) has a repeating unit of the following:

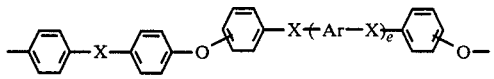

wherein Ar is a divalent aromatic radical selected from phenylene, biphenylene or napthylene, X is independently O, $$\overset{O}{\underset{\|}{C,}}$$

or a direct bond and e is 0 or 1.

12. A blend as defined in claim 1 wherein the poly(aryl ether ketone) has a repeating unit of the following formula:

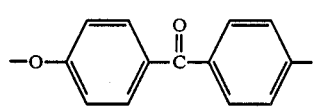

wherein Ar is a divalent aromatic radical selected from phenylene, biphenylene or naphthylene, X is independently O, or a direct bond and e is 0 or 1.

13. A blend as defined in claim 1 wherein the poly(aryl ether ketone) has a repeating unit of the formula:

14. A blend as defined in claim 1 wherein the poly(aryl ether ketone) has a repeating unit of the formula:

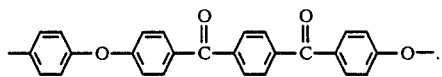
15. A blend as defined in claim 1 wherein the poly(aryl ether ketone) has a repeating unit of the formula:
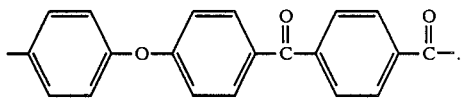
16. A blend as defined in claim 1 wherein the poly(aryl ether ketone) has a repeating unit selected from one or more of the following:
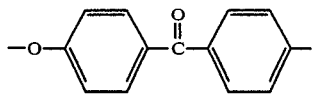
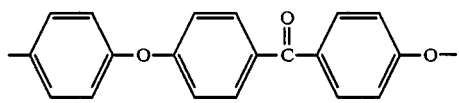
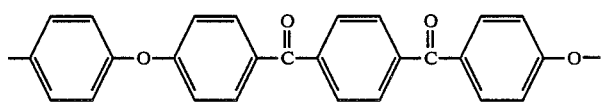
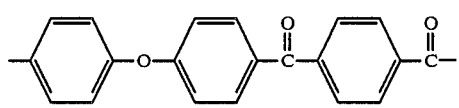
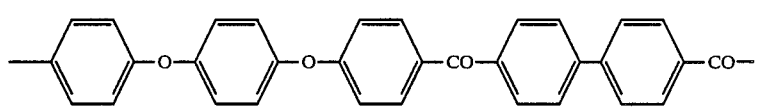
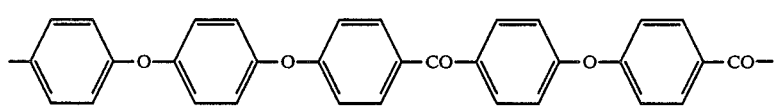
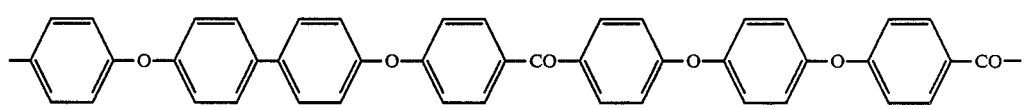
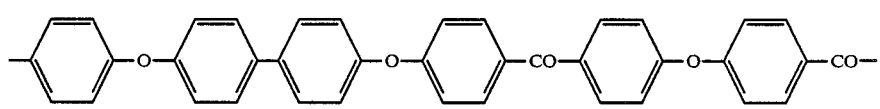
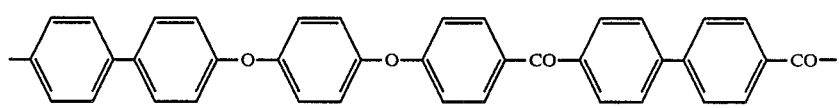
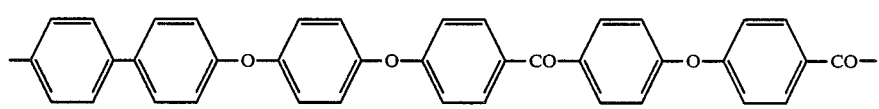
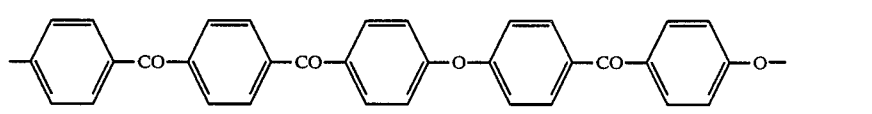

-continued
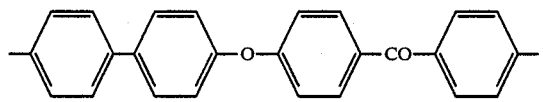
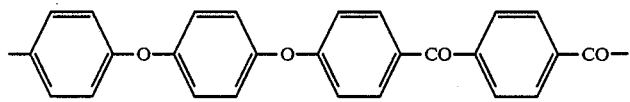
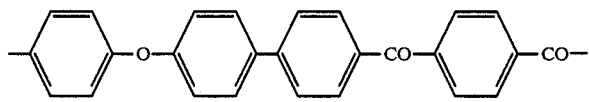
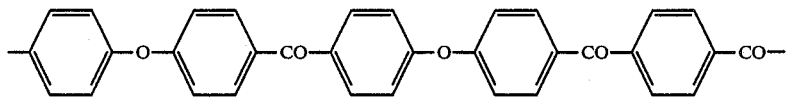
17. A blend comprising a biphenyl containing poly(aryl ether sulfone) and a poly(aryl ether ketone), wherein said poly(aryl ether sulfone) comprises from 50 to 95 weight percent of said poly(aryl ether sulfone) and poly(aryl ether ketone).
* * * * *

UNITED STATES PATENT OFFICE
CERTIFICATE OF CORRECTION

Patent No. 4,804,724         Dated February 14, 1989

Inventor(s) James Elmer Harris, Lloyd Mahlon Robeson

It is certified that error appears in the above-identified patent and that said Letters Patent is hereby corrected as shown below:

Column   Line

Abstr.   1-2   "(acryl ether sulfone)" should read --(aryl ether sulfone)--
Abstr.   2     "(acryl ether ketone)." should read --(aryl ether ketone).--
18       6     "TA8LE" should read --TABLE--

Signed and Sealed this

Fifteenth Day of August, 1989

Attest:

DONALD J. QUIGG

Attesting Officer

Commissioner of Patents and Trademarks